US012699580B2

(12) United States Patent
Das

(10) Patent No.: US 12,699,580 B2
(45) Date of Patent: Aug. 4, 2026

(54) PARAVIRTUAL PAUSE LOOPS IN GUEST USER SPACE

(71) Applicant: Red Hat, Inc., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 714 days.

(21) Appl. No.: 17/971,808

(22) Filed: Oct. 24, 2022

(65) Prior Publication Data

US 2024/0134669 A1 Apr. 25, 2024
US 2024/0231867 A9 Jul. 11, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01)

(58) Field of Classification Search
CPC ........ G06F 9/45558; G06F 2009/4557; G06F 2009/45575
See application file for complete search history.

(56) References Cited

U.S. PATENT DOCUMENTS

| | | | | |
|---|---|---|---|---|
| 6,681,241 | B1 * | 1/2004 | Fagen | G06F 9/52 |
| | | | | 718/100 |
| 6,721,775 | B1 * | 4/2004 | Fagen | G06F 9/524 |
| | | | | 718/100 |
| 6,892,383 | B1 * | 5/2005 | Arndt | G06F 9/5077 |
| | | | | 718/1 |
| 7,765,543 | B1 * | 7/2010 | Weissman | G06F 9/5022 |
| | | | | 718/1 |
| 7,784,060 | B2 | 8/2010 | Baumberger | |
| 8,230,203 | B2 | 7/2012 | Neiger | |
| 9,021,497 | B1 | 4/2015 | Thimmappa | |
| 9,058,183 | B2 | 6/2015 | Woller | |
| 9,411,630 | B1 * | 8/2016 | Adams | G06F 9/45558 |
| 10,127,068 | B2 | 11/2018 | Liguori | |
| 10,592,281 | B1 * | 3/2020 | Saidi | G06F 9/4881 |
| 10,936,353 | B2 | 3/2021 | Iyer | |
| 11,126,474 | B1 * | 9/2021 | Zidenberg | G06F 9/5016 |

(Continued)

OTHER PUBLICATIONS

J. Shan et al., APLE: Addressing Lock Holder Preemption Problem with High Efficiency, 2015 IEEE 7th International Conference on Cloud Computing Technology and Science, 2015, pp. 242-249, 978-1-4673-9560-1/15.

(Continued)

*Primary Examiner* — Lewis A Bullock, Jr.
(74) *Attorney, Agent, or Firm* — Kilpatrick Townsend & Stockton LLP

(57) ABSTRACT

Paravirtual pause loops in guest user space are provided by implementing, by a hypervisor for a virtualization environment, a paravirtual sleep command from a certain virtual machine of a plurality of virtual machines operating in the virtualization environment, the paravirtual sleep command indicating an instruction and a resource that the certain virtual machine is waiting on to perform the instruction; adding an entry to a work queue managed by the hypervisor for the plurality of virtual machines; and in response to the resource becoming available for the certain virtual machine: removing the entry from the work queue; and waking the certain virtual machine to perform the instruction with the resource.

17 Claims, 4 Drawing Sheets

(56)                References Cited

U.S. PATENT DOCUMENTS

| | | | | |
|---|---|---|---|---|
| 2006/0130062 A1* | 6/2006 | Burdick | ............... | G06F 9/4881 |
| | | | | 718/100 |
| 2010/0011360 A1* | 1/2010 | Fontenot | ................ | G06F 9/526 |
| | | | | 718/100 |
| 2011/0072426 A1* | 3/2011 | Huang | ............... | G06F 9/45558 |
| | | | | 718/1 |
| 2011/0099267 A1* | 4/2011 | Suri | ..................... | G06F 9/5022 |
| | | | | 718/1 |
| 2013/0227555 A1* | 8/2013 | Tsirkin | ............... | G06F 9/45558 |
| | | | | 718/1 |
| 2014/0149979 A1* | 5/2014 | Tsirkin | ............... | G06F 9/45533 |
| | | | | 718/1 |
| 2016/0004863 A1* | 1/2016 | Lazri | .................... | G06F 21/554 |
| | | | | 726/23 |
| 2016/0154669 A1* | 6/2016 | Tsirkin | ............... | G06F 9/45558 |
| | | | | 718/1 |
| 2017/0090996 A1* | 3/2017 | Birke | ................. | G06F 11/0787 |
| 2017/0206103 A1* | 7/2017 | Arndt | ................. | G06F 9/45533 |
| 2018/0060112 A1* | 3/2018 | Arndt | .................... | G06F 9/5038 |
| 2019/0258501 A1* | 8/2019 | Tsirkin | ............... | G06F 11/3037 |
| 2021/0216348 A1* | 7/2021 | Sharma | .............. | G06F 9/44505 |
| 2022/0121445 A1* | 4/2022 | Deacon | ................. | G06F 9/3836 |
| 2022/0214968 A1* | 7/2022 | Warkentin | .......... | G06F 13/1668 |
| 2023/0087153 A1* | 3/2023 | Park | ................... | G06F 9/45558 |
| | | | | 711/154 |
| 2023/0138145 A1* | 5/2023 | Mizutani | ............ | G06F 9/45558 |
| | | | | 718/1 |

OTHER PUBLICATIONS

J. Shan et al., APPLES: Efficiently Handling Spin-lock Synchroni-
zation on Virtualized Platforms, IEEE Transactions on Parallel and
Distributed Systems, vol. 28, No. 7, Jun. 14, 2017, pp. 1811-1824,
DOI 10.1109/TPDS.2016.2625249.

* cited by examiner

100

300

PARAVIRTUAL PAUSE LOOPS IN GUEST USER SPACE

BACKGROUND

Pause loops are a common programmatic practice in virtualized computing environments when waiting for a resource to be released. The PAUSE instruction is included in a loop (e.g., a while loop) to notify the processor running the instructions that a program is waiting for resources to become available, so that the processor can adjust performance of the tasks to improve power consumption and performance of other programs executed on the processor that are not waiting for resources. For example, in an x86 processor hosting a guest environment, the processor can either allows the guests' Operating Systems (OS) to intercept PAUSE instructions or let the guests' OS execute PAUSE instructions without an exit. In some instances, the resource/lock is available in a short time and there is no need for an exit; however, in other instances, the resource/lock is not available and a virtual machine (VM) exit command (e.g., VMEXIT) is executed so that the physical processor may be used for other guest execution threads or host OS processes.

SUMMARY

The present disclosure provides new and innovative way to handle PAUSE instructions via paravirtualization of the pause behavior that give the hypervisor in a virtualization environment greater control over pause behaviors. In one example, a method is provided that includes: implementing, by a hypervisor for a virtualization environment, a paravirtual sleep command from a certain virtual machine of a plurality of virtual machines operating in the virtualization environment, the paravirtual sleep command indicating an instruction and a resource that the certain virtual machine is waiting on to perform the instruction; adding an entry to a work queue managed by the hypervisor for the plurality of virtual machines; and in response to the resource becoming available for the certain virtual machine: removing the entry from the work queue; and waking the certain virtual machine to perform the instruction with the resource.

In one example, a system is provided that comprises a processor; and a memory, including instructions that when executed by the processor perform operations including: implementing, by a hypervisor for a virtualization environment, a paravirtual sleep command from a certain virtual machine of a plurality of virtual machines operating in the virtualization environment, the paravirtual sleep command indicating an instruction and a resource that the certain virtual machine is waiting on to perform the instruction; adding an entry to a work queue managed by the hypervisor for the plurality of virtual machines; and in response to the resource becoming available for the certain virtual machine: removing the entry from the work queue; and waking the certain virtual machine to perform the instruction with the resource.

In one example, a memory device is provided that includes instructions that when executed by a processor perform operations including: implementing, by a hypervisor for a virtualization environment, a paravirtual sleep command from a certain virtual machine of a plurality of virtual machines operating in the virtualization environment, the paravirtual sleep command indicating an instruction and a resource that the certain virtual machine is waiting on to perform the instruction; adding an entry to a work queue managed by the hypervisor for the plurality of virtual machines; and in response to the resource becoming available for the certain virtual machine: removing the entry from the work queue; and waking the certain virtual machine to perform the instruction with the resource.

Additional features and advantages of the disclosed methods, devices, and/or systems are described in, and will be apparent from, the following Detailed Description and the Figures.

DETAILED DESCRIPTION

Virtualization environments provide for physical computer systems to act as hosts to multiple guests, which are virtualized computer systems than run on a shared set of hardware (e.g., a given physical computer system). Accordingly, multiple guests can act as Virtual Machines (VM) running on the shared physical hardware, which is managed by a hypervisor to assign various physical resources to meet the needs of the virtual resources used by the VMs. However, when a certain VM is waiting on a particular resources to become available, if hypervisor could reassign the physical resource to another VM to use in the meanwhile, the hypervisor would thereby improve the computational efficiency and power efficiency of the virtualization environment compared to simply allowing the physical resource to idle during the wait time. Because idle times are a performance bottleneck in hardware virtualization, reducing idle time via hypervisor coordination is an advantage for performance intensive workloads in the cloud.

Accordingly, the present disclosure provides for greater hypervisor control of guest-initiated spin-loops via paravirtualization of the pause behavior to improve the computational and power efficiency of a virtualization environment, among other benefits, by passing control of checking for resource availability to the host from the guests.

Figure 1:
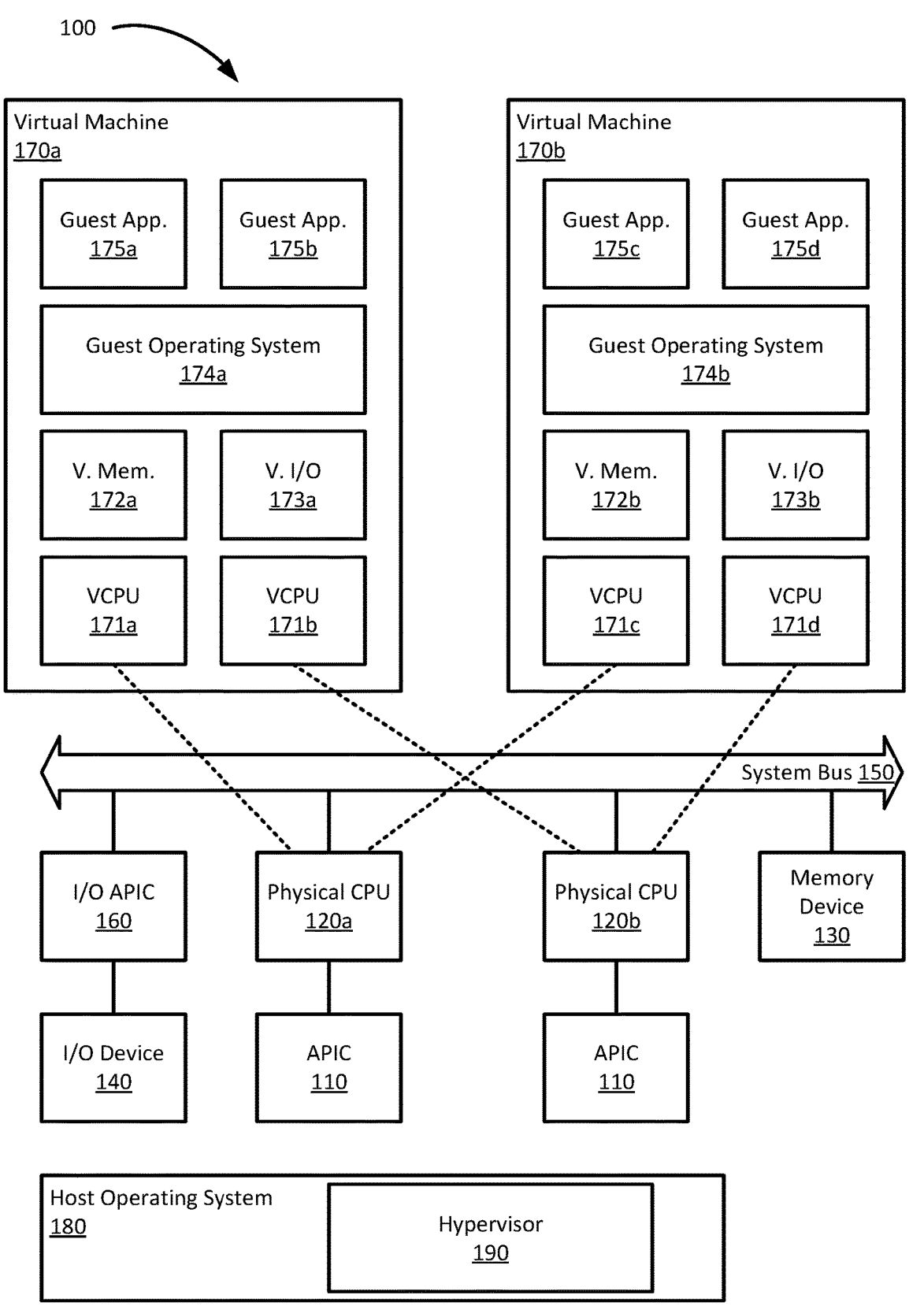
FIG. 1 illustrates a high-level component diagram of a computer system, according to examples of the present disclosure

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

Figure 2:
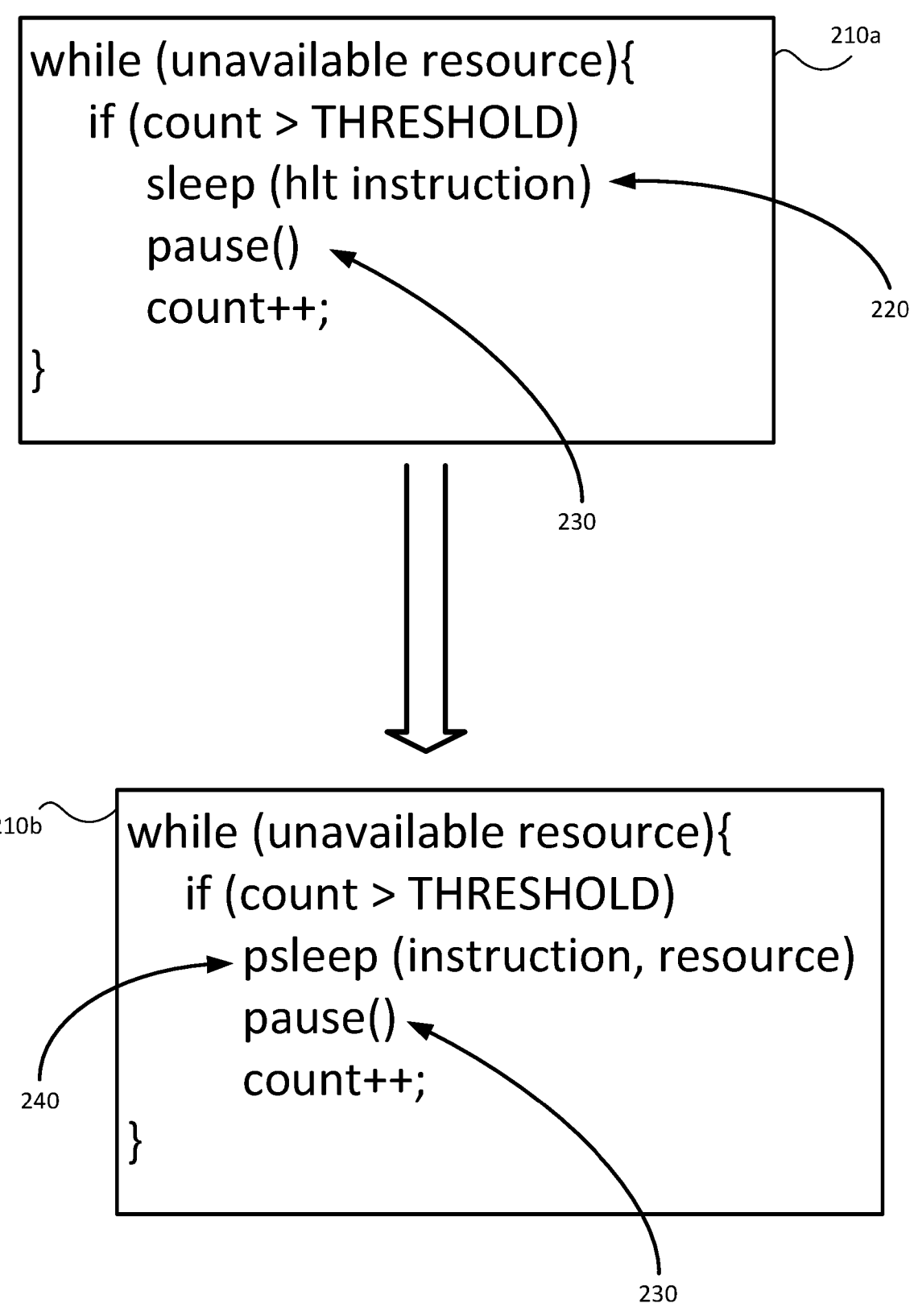
FIG. 2 illustrates example code segments for performing a paravirtualized PAUSE instruction, according to examples of the present disclosure.

FIG. 2 illustrates example code segments 210a-b (generally or collectively, code segment 210) for performing a paravirtualized PAUSE instruction, according to examples of the present disclosure. Pause loops are common when waiting for a resource, also referred to as a "lock", to be released. The PAUSE instruction itself informs the physical CPU 120 that a waiting loop is occurring so that power consumption and performance can be adjusted accordingly. In various guest environments, there are few ways to control the pause behavior when in the user mode (e.g., Current Privilege Level (CPL)=3); the CPU 120 either allows the guest OS intercept PAUSE commands or lets the guest OS execute PAUSE without an exit. While waiting for the lock to become available, the physical CPU 120 is expending power and processing cycles on a task that is not actually beneficial to the processing goals of the VM 170 from which the PAUSE command was received. Stated differently, these computing resources spent on waiting for the lock to become available, if used for other processes (e.g., from another VM 170), would improve the overall efficiency of virtualization environment 100. Accordingly, by switching the processing load away from the waiting loop for a first VM 170a to another (more productive) task and switching back to the first VM 170a when the resource is again available, the hypervisor can better allocate computing power due to the hypervisor's greater knowledge of the overall virtualization environment 100 than the individual VMs 170.

The first code segment 210a illustrates a guest-controlled spin-loop to wait for a resource to become available. A SLEEP instruction 220, indicating the instruction to halt while waiting for the resource to become available is followed by a PAUSE instruction 230 in a while-loop format that is performed for a threshold number of clock cycles before initiating a VMEXIT command to break out of the spin-loop. The PAUSE instruction 230, which may optionally be omitted, indicates to the processor that the code following the PAUSE instruction 230 is part of a spin-loop so that the processor can suspend execution of the thread for a given number of cycles, to potentially promote other threads for processing while waiting for the resource to become available again. The resources may include other processors, memory, data in memory (e.g., data being accessed by another thread), various I/O devices 140, or the like.

The second code segment 210b illustrates a hypervisor-controlled spin-loop to wait for a resource to become available. A PSLEEP instruction 240, indicating the instruction and the associated resource that the VM 170 is waiting on to perform the instruction is followed by a PAUSE instruction 230 in a while-loop format that is performed for a threshold number of clock cycles before initiating a VMEXIT command to break out of the spin-loop. The PAUSE instruction 230, which may optionally be omitted, indicates to the processor that the code following the PAUSE instruction 230 is part of a spin-loop so that the processor can suspend execution of the thread for a given number of cycles, to potentially promote other threads for processing while waiting for the resource to become available again.

The PSLEEP instruction 240 shifts the responsibility for checking on resource availability from the guest operating system 174 for the certain VM 170 that is waiting for a resource to the hypervisor 190, which controls resource allocations across the plurality of VMs 170 operating in the virtualization environment 100. By offloading the check for resource availability from the individual VMs 170 to the hypervisor 190, the VM 170 can be signaled sooner when the resource becomes available to the VM 170 and not have the threads wait to be woken up by the guest OS 174.

In the guest-controlled implementation, the thread may spins for a several clock cycles (wasting computing resources and power) until the thread eventually sleeps waiting to be woken up, which is what typically causes a VMEXIT. In contrast, a paravirtual, such as the PSLEEP instruction 240, that the guest is free to use. When a VM 170 performs the PSLEEP instruction 240, the VM 170 performs a VMEXIT to the hypervisor 190, and passes the instruction and the resource needed by the instruction to the hypervisor 190 to add an entry to a work queue to monitor on behalf of the submitting VM 170.

On receipt, the hypervisor 190 registers a function to check whether the resource is available, which may be in a guest-specific, multi-guest, or environment-wide work queue (e.g., one queue for each VM 170, one queue for several VMs 170 (e.g., of a particular class), one queue for all VMs 170). The hypervisor 190 adds the VPCU 171 to the selected queue, and calls a scheduling function to monitor when the resource is again available to the requesting VCPU 171. In various embodiments, the queue may operate according to a first-in-first-out (FIFO) schema so that earlier requestors for a certain resource are given earlier access to the resource than later requestors, and/or via a priority schema so that requestors with a higher priority or privilege levels are given earlier access to the resource than requestors with lower priority or privilege levels.

The hypervisor 190 stores the address of the unavailable resource in a first known register (e.g., RAX) and moves the condition to ascertain whether the resource is available to a second known register (e.g., RBX). Accordingly, when the hypervisor 190 and the guest follow a standard protocol, the hypervisor 190 knows the location/condition for the resource to be checked. Once a resource becomes available for a given entry in the queue and the associated VCPU 171 can run, the hypervisor 190 marks the thread in the given entry as runnable, removes the entry from the queue, and schedules the VPCU thread for executing (e.g., removing the thread from a wait list). When the VCPU thread is scheduled, during the next run, the spin-loop is broken break, thereby allowing the VM 170 to proceed with operations, unless the resource is again taken up by another thread in which case the process repeats.

The hypervisor 190 adds the associated VCPU 171 and the resource address/condition to a wait list of tasks in a worker thread in the host that busy polls the wait list. Using the approach in the first code segment 210a, the VM 170 calling HLT results in a VMEXIT, and the VCPU 171 is blocked and woken up only when a signal is pending on the requesting VCPU 171 (the signal can come from another VCPU 171 of the VM 170 such as an inter-processor-interrupt (IPI)). However, the VCPU 170 blocking/unblocking mechanism used in the first code segment 210a is a computationally intensive process. In contrast, with paravirtualization approach shown in the second code segment 210b, when a resource is available, the hypervisor 190 immediately marks the VCPU thread runnable because the hypervisor 190 knows the address of the resource, which was previously shared by the VM 170 via the PSLEEP instruction. Accordingly, with the paravirtualization approach, the hypervisor 190 can schedule and initiate a VCPU thread when the hypervisor 190 knows the resource is available and the VM 170 is ready to execute the instruction waiting on the resource, potentially avoiding the VCPU blocking/unblocking path.

Accordingly, by the hypervisor 190 tracking an active list of guest resources, the virtualization environment 100 realizes increases guest performance as a tradeoff for increased work done by the physical CPUs 120. With increasing core counts for processors, the hypervisor/cloud operator can spare the computing resources to run the guest specific resource availability function in a dedicated workqueue in the host and intimate the target VCPU 171 as soon as possible. In some embodiments, the hypervisor 190 runs more than one workqueue per VM 170 for better performance, depending on availability of spare cores in the virtualization environment 100. In some such embodiments, the multiple-queues feature is provided so that a cloud tenant does not have to reserve extra cores to get the added advantage of improved idle times. Overall, by combining the paravirtualization approach with existing paravirtual performance improvements, the hypervisor 190 has the potential to run the blocked VPCU 170 thread sooner for improved guest performance.

For a VM 170 to access the benefits of paravirtualization described herein, the guest simply substitutes the first code segment 210a for the second code segment 210b to use the paravirtual instruction similarly to how the guest would use HLT instruction. Signals and events can still wake up this VCPU thread in which case, the hypervisor 190 simply removes the requesting VCPU from the "resource available" checklist. The added behavioral change includes the synchronous waking up of the VCPU thread, and the guest is still descheduled. Accordingly, if the guest chooses to use the PLSEEP instruction instead of the HLT instruction in the SLEEP instruction, the hypervisor 190 has knowledge of the guest resource that is currently unavailable, thereby resulting in faster rescheduling of the VCPU thread. Note, that rescheduling can also be done from inside the VM 170, which requires reserving physical CPUs 120 to spend cycles spinning, and the hypervisor 190 also spends resources to ensure that the HLT instruction does not cause a VMEXIT. Stated differently, VM-responsiveness can be increased if the hyervisor 190 reserves (e.g., pins) physical CPUs 120 to VCPU-threads and disables exits on HLT and PAUSE instructions so that when a spin loop is reached by the guest, the VCPUs 171 essentially spin without an exit to thereby increase responsiveness to the availability of the resource, at the cost of additional host CPU cycles. In contrast, with the VM-operated approach, the hypervisor 190 according to the paravirtualization approach can use a single physical CPU 120 for all VMs 170 (or all VCPUs 171 of single VM 170) to track locked resources and mark blocked VCPU threads as runnable more quickly and using fewer processor cycles.

Figure 3:
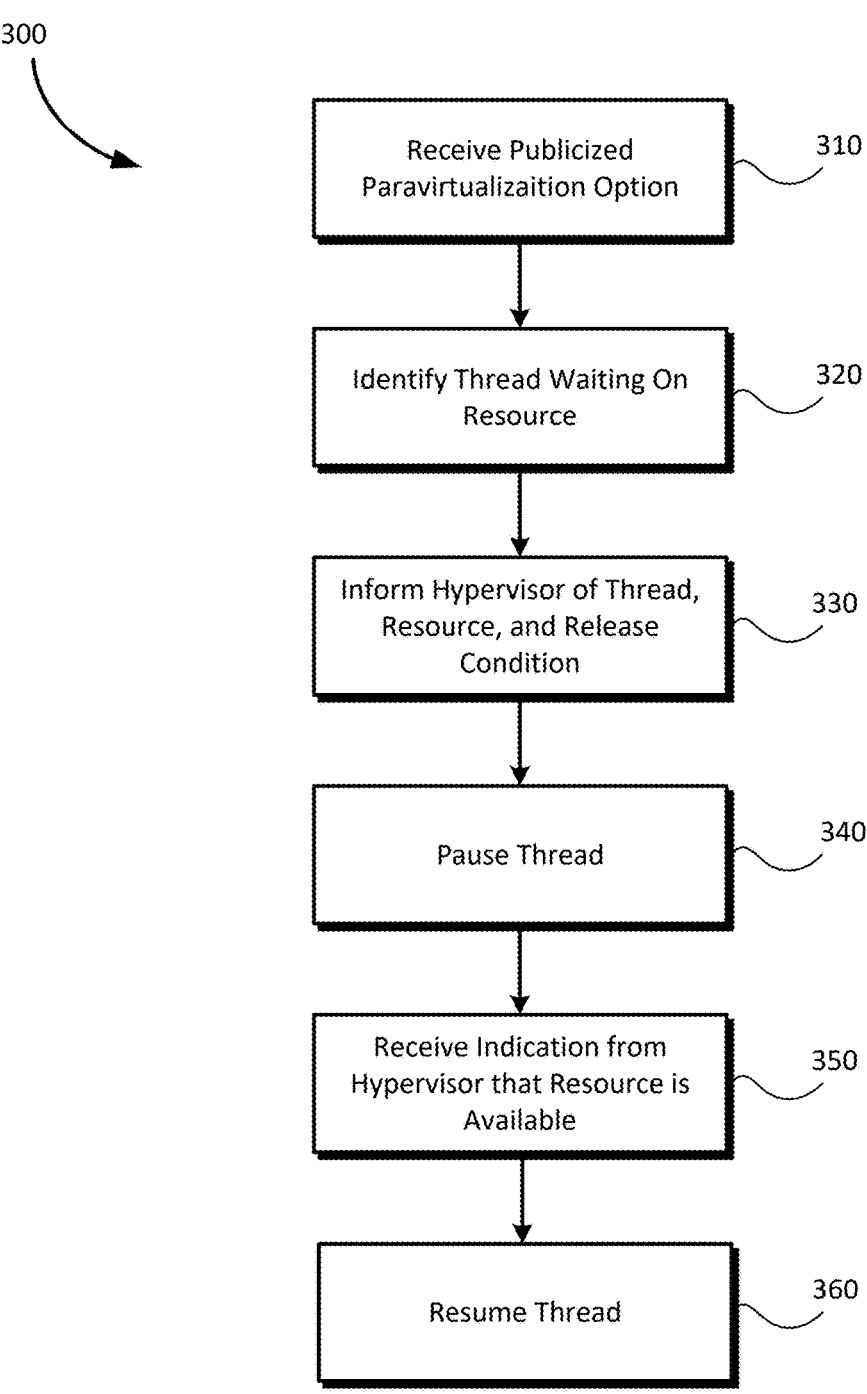
FIG. 3 is a flowchart of a method for performing a paravirtualized PAUSE instruction, according to examples of the present disclosure.

FIG. 3 is a flowchart of a method for performing a paravirtualized PAUSE instruction, according to examples of the present disclosure. Method 300 begins at block 310, where a guest (e.g., a VM 170) receives a publicized paravirtualzation option for how to handle spin-loops from the host of a virtualization environment 100 (e.g., via the hypervisor 190). In various embodiments, the host alerts some or all of the guests to the availability of the paravirtualization option via CPUID, so that the individual guests can elect to use the PSLEEP instruction in place of the SLEEP and HLT instructions when waiting for a resource to become available.

At block 320, the guest identifies that a thread is waiting on a resource that is currently unavailable to become available again. In various embodiments, the resource may include physical hardware or data stored on physical hardware that is currently being used by another thread.

At block 330, the guest informs the hypervisor 190 of the thread, the resource that the thread is waiting on, and the release condition to determine when the resource is available. In various embodiments, the guest informs the hypervisor 190 via the PSLEEP instruction, which transfers responsibility for monitoring availability of the resource from the guest to the hypervisor.

In response to transferring the monitoring responsibility (per block 330), method 300 proceeds to block 340, where the thread is paused until the guest receives an indication from the hypervisor 190 at block 350 that the resource is available.

In response to receiving an indication from the hypervisor 190 that the resource is available (per block 350), method 300 proceeds to block 360, where the guest resumes the thread that was paused (per block 340) while waiting for the resource to become available. The availability of the resource when the guest resumes the thread allows the guest to resume the thread, breaking out of the spin-loop, and continue processing as scheduled by the hypervisor 190 with less delay (and lower risk of another process claiming the resource in the meantime).

Figure 4:
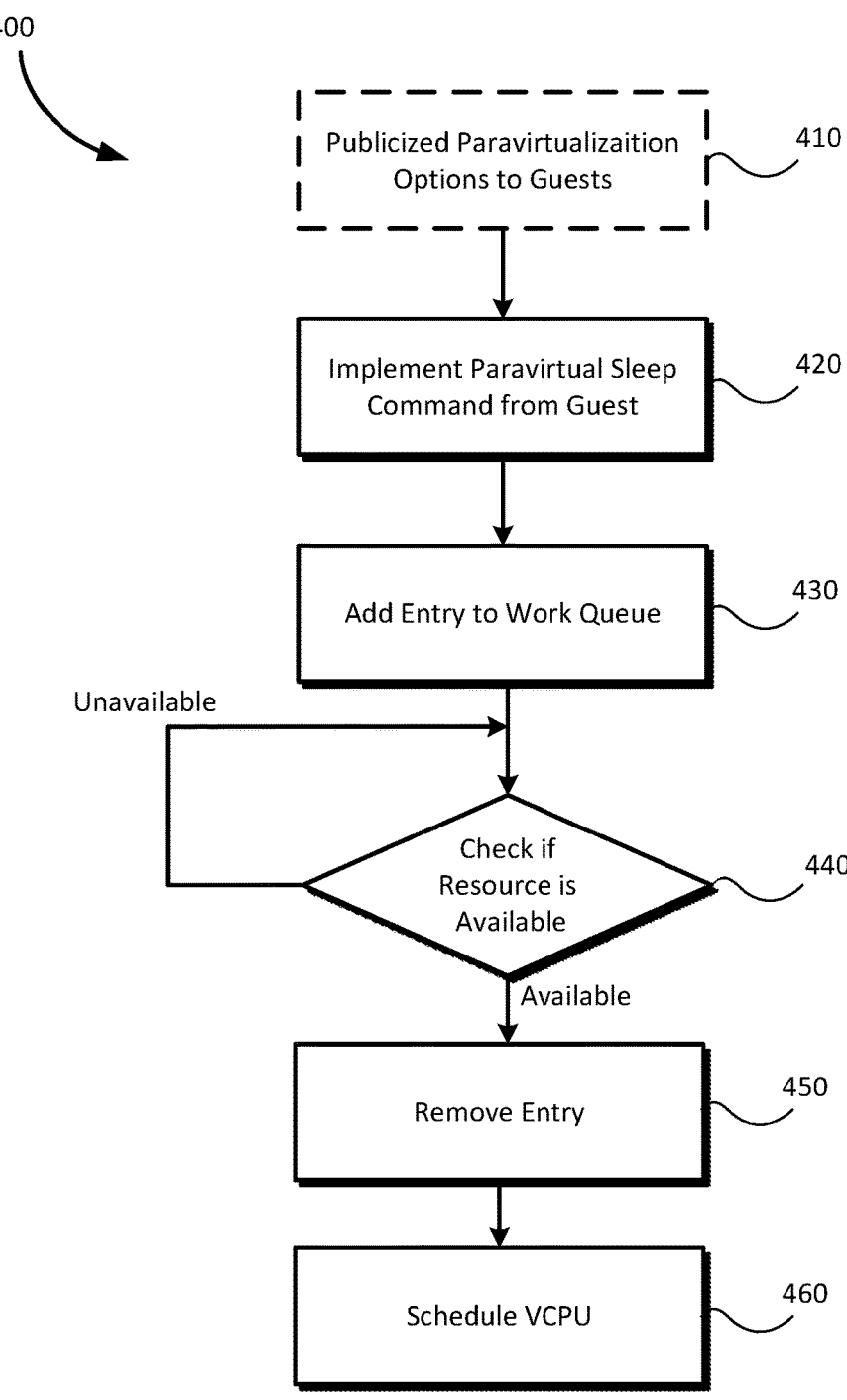
FIG. 4 is a flowchart of a method for performing a paravirtualized PAUSE instruction, according to examples of the present disclosure.

FIG. 4 is a flowchart of a method 400 for performing a paravirtualized PAUSE instruction, according to examples of the present disclosure. Method 400 begins at block 410, where the hypervisor 190 publicizes to some or all of the guests in the virtualization environment 100 that paravirtualized PAUSE instructions are an option for those guests to use to transfer resource monitoring from the VMS 170 to the hypervisor 190. The paravirtualized PAUSE instructions may be publicized as an optional or required alternative for a sleep command included in a processor architecture used for the VCPUs 171 or PCPUs 120 in the virtualization environment 100. Block 410 may be performed once, periodically (e.g., every X clock cycles, every Y seconds, etc.), or in response to a change in the guests operating in the virtualization environment 100. Accordingly, block 410 may be performed independently of or in parallel to blocks 420-460 of method 400, and some instances of method 400 may operate without performing block 410 when an earlier instance of method 400 previously performed block 410.

At block 420, the hypervisor 190 implements a paravirtual sleep command from a guest (e.g., trapping the command). The paravirtual sleep command may be part of a code segment running a spin-loop to wait for a resource to become available for a thread. (e.g., PSLEEP instruction 240 in the second code segment 210b of FIG. 2), which indicates to the hypervisor 190 a certain VM 170 (or VCPU 171 thereof) that indicates an instruction or thread and a resource that the VM 170 is waiting on to continue performing the thread or instruction.

At block 430, the hypervisor 190 adds an entry to a work queue to track the availability of the resource (indicated per block 420) on behalf of the guest. The hypervisor 190 stores the address of the currently unavailable resource and a release condition for the currently unavailable resource that indicates when that resource is considered to be available again. These data are stored to registers of a PCPU 120 used by the hypervisor 190 to monitor the availability of the indicated resources as part of a work queue, which may be specific to a certain VM 170 or certain VCPU 171, or may be used to aggregate resource queueing requests among several VMs 170 or VCPUs 171.

At block 440, the hypervisor 190 checks whether the resource indicated by the guest as being waited on has become available. In response to the resource becoming available, method 400 proceeds to block 450. Otherwise, when the resource is still unavailable, method 400 cycles back to block 440 to continue monitoring availability of the resource. The hypervisor 190 may perform block 440 as a spin-loop using a dedicated PCPU 120 that allocated processor cycles among one or several work queues.

At block 450, the hypervisor 190 removes the entry from the work queue in response to determining (per block 440) that the resource has become available.

At block 460, the hypervisor 190 schedules the VCPU 171 running the thread for which the paravirtual sleep command was received (per block 420) to resume the thread with the now-available resource. By scheduling the VCPU 171, the hypervisor 190 wakes the VM 171 from sleep to perform the instructions with the resource, thereby breaking out of the spin-loop and potentially allowing the guest to resume operations sooner than if the guest were monitoring the resource availability via a VCPU 171 subject to scheduling effects by the hypervisor 190.

Programming modules, may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable user electronics, minicomputers, mainframe computers, and the like. Embodiments may also be practiced in distributed computing environments where tasks are performed by remote processing devices that are linked through a communications network. In a distributed computing environment, programming modules may be located in both local and remote memory storage devices.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:

publicizing, by a hypervisor to a plurality of virtual machines operating in a virtualization environment, a code segment comprising a paravirtual sleep command that is a hypervisor controlled spin loop configured to wait for availability of a requested resource by a requesting virtual machine before waking the requesting virtual machine upon the availability of the requested resource;

based on the publicized code segment, receiving, by a guest operating system associated with a certain virtual machine of the plurality of virtual machines operating on the hypervisor for the virtualization environment, an instance of the paravirtual sleep command associated with the certain virtual machine of the plurality of virtual machines operating in the virtualization environment, the instance of the paravirtual sleep command indicating an instruction and a resource that the certain virtual machine is waiting on to perform the instruction;

based on the instance of the paravirtual sleep command associated with the certain virtual machine, implementing, by the hypervisor, the paravirtual sleep command to transfer a responsibility of implementing the instance of the paravirtual sleep command and monitoring availability of the resource from the guest operating system of the certain virtual machine to the hypervisor, wherein implementing the instance of the paravirtual sleep command and monitoring the availability of the resource includes:

adding an entry to a work queue managed by the hypervisor for the certain virtual machine of the plurality of virtual machines; and in response to the resource becoming available for the certain virtual machine:

removing the entry from the work queue; and waking the certain virtual machine to perform the instruction with the resource.

2. The method of claim 1, wherein waking the certain virtual machine includes scheduling a virtual central processing unit (VCPU) to perform the instruction.

3. The method of claim 1, wherein the hypervisor adds the entry to the work queue according to a First-In-First-Out schema, wherein determining whether the resource has become available for the certain virtual machine includes determining that no other virtual machines of the plurality of virtual machines are associated with entries for the resource that were added to the work queue before the entry was added to the work queue.

4. The method of claim 1, wherein the hypervisor adds the entry to the work queue according to a privilege level schema, wherein determining whether the resource has become available for the certain virtual machine includes determining that no other virtual machines of the plurality of virtual machines with a higher privilege level for the resource than the certain virtual machine are associated with entries for the resource currently in the work queue.

5. The method of claim 1, further comprising:

implementing, by the hypervisor, a second paravirtual sleep command from the certain virtual machine, the second paravirtual sleep command indicating a second instruction and a second resource that the certain virtual machine is waiting on to perform the second instruction, wherein the second resource is different from the resource;

adding a second entry to the work queue managed by the hypervisor for the plurality of virtual machines; and in response to the second resource becoming available for the certain virtual machine:

removing the second entry from the work queue; and waking the certain virtual machine to perform the second instruction with the second resource.

6. The method of claim 1, wherein the hypervisor stores an address of the resource on a first register of a physical processor monitoring the work queue and stores a release condition for the resource on a second register of the physical processor.

7. A system, comprising:

a processor; and a memory, including instructions that when executed by the processor perform operations including:

publicizing, by a hypervisor to a plurality of virtual machines operating in a virtualization environment, a code segment comprising a paravirtual sleep command that is a hypervisor controlled spin loop configured to wait for availability of a requested resource by a requesting virtual machine before waking the requesting virtual machine upon the availability of the requested resource;

based on the publicized code segment, receiving, by a guest operating system associated with a certain virtual machine of the plurality of virtual machines operating on the hypervisor for the virtualization environment, an instance of the paravirtual sleep command associated with the certain virtual machine of the plurality of virtual machines operating in the virtualization environment, the instance of the paravirtual sleep command indicating an instruction and a resource that the certain virtual machine is waiting on to perform the instruction;

based on the instance of the paravirtual sleep command associated with the certain virtual machine, implementing, by the hypervisor, the paravirtual sleep command to transfer a responsibility of implementing the instance of the paravirtual sleep command and monitoring availability of the resource from the guest operating system of the certain virtual machine to the hypervisor, wherein implementing the instance of the paravirtual sleep command and monitoring the availability of the resource includes:

in response to implementing the paravirtual sleep command, adding an entry to a work queue managed by the hypervisor for the certain virtual machine of the plurality of virtual machines; and in response to the resource becoming available for the certain virtual machine:

removing the entry from the work queue; and waking the certain virtual machine to perform the instruction with the resource.

8. The system of claim 7, wherein waking the certain virtual machine includes scheduling a virtual central processing unit (VCPU) to perform the instruction.

9. The system of claim 7, wherein the hypervisor adds the entry to the work queue according to a First-In-First-Out schema, wherein determining whether the resource has become available for the certain virtual machine includes determining that no other virtual machines of the plurality of virtual machines are associated with entries for the resource that were added to the work queue before the entry was added to the work queue.

10. The system of claim 7, wherein the hypervisor adds the entry to the work queue according to a privilege level schema, wherein determining whether the resource has become available for the certain virtual machine includes determining that no other virtual machines of the plurality of virtual machines with a higher privilege level for the resource than the certain virtual machine are associated with entries for the resource currently in the work queue.

11. The system of claim 7, the operations further comprising:

implementing, by the hypervisor, a second paravirtual sleep command from the certain virtual machine, the second paravirtual sleep command indicating a second instruction and a second resource that the certain virtual machine is waiting on to perform the second instruction, wherein the second resource is different from the resource;

adding a second entry to the work queue managed by the hypervisor for the plurality of virtual machines; and in response to the second resource becoming available for the certain virtual machine:

removing the second entry from the work queue; and waking the certain virtual machine to perform the second instruction with the second resource.

12. The system of claim 7, wherein the hypervisor stores an address of the resource on a first register of a physical processor monitoring the work queue and stores a release condition for the resource on a second register of the physical processor.

13. A memory, including instructions that when executed by a processor perform operations including:

publicizing, by a hypervisor to a plurality of virtual machines operating in a virtualization environment, a code segment comprising a paravirtual sleep command that is a hypervisor controlled spin loop configured to wait for availability of a requested resource by a requesting virtual machine before waking the requesting virtual machine upon the availability of the requested resource;

based on the publicized code segment, receiving, by a guest operating system associated with a certain virtual machine of the plurality of virtual machines operating on the hypervisor for the virtualization environment, an instance of the paravirtual sleep command associated with the certain virtual machine of the plurality of virtual machines operating in the virtualization environment, the instance of the paravirtual sleep command indicating an instruction and a resource that the certain virtual machine is waiting on to perform the instruction;

based on the instance of the paravirtual sleep command associated with the virtual machine, implementing, by the hypervisor, the paravirtual sleep command to transfer a responsibility of implementing the instance of the paravirtual sleep command and monitoring availability of the resource from the guest operating system of the certain virtual machine to the hypervisor, wherein implementing the instance of the paravirtual sleep command and monitoring the availability of the resource includes:

in response to implementing the paravirtual sleep command, adding an entry to a work queue managed by the hypervisor for the certain virtual machine of the plurality of virtual machines; and in response to the resource becoming available for the certain virtual machine:

removing the entry from the work queue; and waking the certain virtual machine to perform the instruction with the resource.

14. The memory of claim 13, wherein waking the certain virtual machine includes scheduling a virtual central processing unit (VCPU) to perform the instruction.

15. The memory of claim 13, wherein the hypervisor adds the entry to the work queue according to a First-In-First-Out schema, wherein determining whether the resource has become available for the certain virtual machine includes determining that no other virtual machines of the plurality of virtual machines are associated with entries for the resource that were added to the work queue before the entry was added to the work queue.

16. The memory of claim 13, wherein the hypervisor adds the entry to the work queue according to a privilege level schema, wherein determining whether the resource has become available for the certain virtual machine includes determining that no other virtual machines of the plurality of virtual machines with a higher privilege level for the resource than the certain virtual machine are associated with entries for the resource currently in the work queue.

17. The memory of claim 13, the operations further comprising:

implementing, by the hypervisor, a second paravirtual sleep command from the certain virtual machine, the second paravirtual sleep command indicating a second instruction and a second resource that the certain virtual machine is waiting on to perform the second instruction, wherein the second resource is different from the resource;

adding a second entry to the work queue managed by the hypervisor for the plurality of virtual machines; and in response to the second resource becoming available for the certain virtual machine:

removing the second entry from the work queue; and waking the certain virtual machine to perform the second instruction with the second resource.

* * * * *